Patented July 12, 1949

2,475,996

UNITED STATES PATENT OFFICE 2,475,996

DINITRO ALCOHOLS AND PROCESS OF PRODUCING THE SAME FROM UNSATURATED ALDEHYDES

Curtis W. Smith, Berkeley, Calif., assignor to Shell Development Company, San Francisco, Calif., a corporation of Delaware No Drawing. Application November 2, 1946, Serial No. 707,544

10 Claims. (Cl. 260—632)

This invention relates to products obtainable by the condensation of an alpha,beta-unsaturated aldehyde with an organic nitro compound. More particularly, the present invention relates to nitro hydroxy compounds that are obtainable by the reaction of an alpha,beta-olefinically unsaturated aldehyde with an organic nitro compound having a nitro group attached to a secondary aliphatic carbon atom, and to a method for their preparation.

It has been discovered, in accordance with the present invention, that the alpha,beta-unsaturated aldehydes may be caused to react with another organic reactant, exemplified by the organic nitro compounds herein employed, to form via carbon-to-carbon addition reaction stable, monomeric products of condensation comprising in each molecule carbon atoms derived from not more than one molecule of the unsaturated aldehyde, and carbon atoms of separate molecules of the second organic reactant linked by carbon-to-carbon bonds to each of the beta and the carbonyl carbon atoms of the unsaturated aldehyde. Heretofore, all condensation reactions known to us of the alpha,beta-unsaturated aldehydes involving the formation of carbon-to-carbon bonds at both the beta and the carbonyl carbon atoms have resulted in the formation of polymeric products of reaction containing in each molecule carbon atoms derived from a plurality of molecules of the unsaturated aldehyde. As contrasted to such prior products, the products provided by the present invention are monomeric and are readily isolatable in the free state, frequently in crystalline form. They are stable; that is, they do not exhibit any appreciable tendency to react further via condensation reactions to form products of higher order than monomeric, as might be obtained by possible interaction of two or more molecules of the monomeric products, or by possible interaction of the monomeric products with either or both of the reactants employed in the process for their preparation. The products of the present invention thus exemplify for the first time stable, monomeric reaction products formed by reaction involving the linkage of carbon atoms of a second organic reactant to both the beta and the carbonyl carbon atoms of an unsaturated aldehyde. In this respect, as well as in others, the present invention represents a significant departure from the art as heretofore known.

The reaction of an alpha,beta-unsaturated aldehyde, in accordance with the present invention, with an organic nitro compound having a nitro group attached to a secondary aliphatic carbon atom provides novel dinitro secondary alcohols that may be represented by the structural formula:

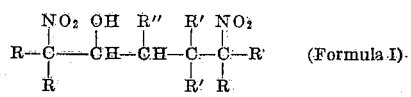 (Formula I).

wherein R represents an organic radical, R' represents either hydrogen or an organic radical, and R" represents either hydrogen, halogen, or an organic radical. Within this class, the particular compound that is obtained is determined by the unsaturated aldehyde and the organic nitro compound that are employed in executing the process of the invention. As the unsaturated aldehyde, there may be employed any of the class known as the alpha,beta-unsaturated aldehydes, i. e., aldehydes having a non-aromatic unsaturated linkage, preferably olefinic in character, connecting the carbon atoms in the alpha and beta positions relative to the carbonyl group. The aldehydes may contain either only hydrogen, carbon, and oxygen, or they also may contain a halogen substituent atom, which preferably is attached only to the alpha carbon atom of the alpha and beta carbon atoms. These aldehydes, in the case of the alpha,beta-olefinically unsaturated aldehydes, may be represented by the structural formula

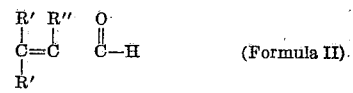 (Formula II).

wherein R' and R" have their previous significance.

The organic radicals that may be represented by R' and R" may be any of a wide variety, such as alkyl, aryl, alkaryl, aralkyl, alkenyl, cycloalkyl, cycloalkenyl, alkenaryl, aralkenyl, heterocyclic, and the like. The particular substituent groups that are present will be determined primarily by the compound that it is desired to prepare by the present process. However, it has been found that the present process may be carried out most effectively when there are employed those unsaturated aldehydes of the above formula in which the organic groups that may be represented by R' and R" are alkyl groups only. The present process thus may be carried out most effectively, and with most satisfactory yields, etc., when an acyclic 2-alkenal containing not more than one olefinic bond is employed as the unsaturated aldehyde. The 2-alkenal, however, may be either straight chain in structure, or it may have a branched chain structure.

Representative aldehydes of this preferred class that may be employed advantageously in the process of the present invention include, for example, acrolein, methacrolein, crotonaldehyde, alpha-ethylacrolein, alpha-methylcrotonaldehyde, alpha,beta-dimethylcrotonaldehyde, alpha-propylacrolein, alpha-isopropyl-beta.-ethylacrolein, and homologous and analogous unsaturated aldehydes. Other unsaturated aldehydes of the present generic class include, for example, alpha-chloroacrolein, alpha-bromoacrolein, alpha-phenylacrolein, alpha-cyclohexylacrolein, alpha-cyclopentylcrotonaldehyde, alpha-cyclohexyl-beta-tolylacrolein, alpha-phenethylacrolein, alpha-phenethyl-beta-methylcrotonaldehyde, alpha- chlorocrotonaldehyde, and homologous and analogous aldehydes corresponding in structure to the foregoing structural formula. Because of their availability as well as because of advantageous results associated with their use in the present process, the preferred aldehydes are acrolein, methacrolein, and crotonaldehyde.

The organic nitro compound that is employed as the second organic reactant in accordance with the present invention, is one having a nitro group directly attached to a secondary aliphatic carbon atom. In general such nitro compounds may be represented by the formula

(Formula III)

wherein R, as previously, represents an organic radical and wherein the carbon atom is a secondary aliphatic carbon atom. The organic groups may be either cyclic or acyclic, aromatic or non-aromatic, saturated or unsaturated, and may be, for example, alkyl, aryl, aralkyl, alkaryl, alkenyl, cycloalkyl, cycloalkenyl, alkenaryl, aralkenyl heterocyclic and the like. Preferably, there are employed those organic nitro compounds of the foregoing formula wherein each R represents an alkyl group, i. e., the mononitroalkanes wherein the nitro group is attached to a secondary carbon atom. Representative nitroalkanes which thus may be employed include, for example, 2-nitropropane, 2-nitrobutane, 2-nitropentane, 3-nitropentane, 2-nitro-3-methylpentane, 3-nitro-2,4-dimethylpentane, 2-nitro-3-isopropylpentane, and homologous and analogous nitroalkanes.

The process of the present invention may be applied most effectively to the preparation of saturated aliphatic dinitro secondary alcohols, in part because of their particular utility in various applications and in part because of the optimum results which thereby may be obtained in the process. Therefore, there preferably are employed the 2-alkenals as the unsaturated aldehyde, as stated previously, in conjunction with the secondary nitroalkanes such as those referred to immediately above.

Reaction between the unsaturated aldehyde and the organic nitro compound may be effected in accordance with the present invention by mixing, or otherwise bringing into reactive contact, the two reactants in the presence of a suitable alkaline catalyst, or condensing agent. Strong or weak alkalies, alkaline salts, and the like may be employed as the alkaline condensing agent. The strong alkalies may tend to cause polymerization of the aldehyde, in known manner, and hence desirably are added with caution and in suitably regulated small amounts. It is preferred to use relatively weak alkaline materials such as a salt of a weak acid and a strong base, an organic amine which preferably is tertiary, and the like. It has been found that condensation agents that are substantially insoluble in the reaction mixture frequently may be employed with particular advantage, since they may be present in excess without detriment to the process, the effective alkalinity being determined and regulated by the solubility of the condensation agent in the reaction mixture, and the like. Potassium carbonate and sodium carbonate are particularly effective members of this latter class. The presence in the reaction mixture of an alkaline material in an amount or of a kind that would promote excessive polymerization of the unsaturated aldehyde reactant desirably is avoided. Other alkaline materials which may be employed include, for example, the alkaline earth metal hydroxides, the alkali metal hydroxides, organic amines such as pyridine, tripropylamine, and the like, and salts such as disodium hydrogen phosphate, trisodium phosphate, sodium borate, sodium acetate, and the like. The amount of the more soluble or more alkaline materials that may be employed most effectively depends upon the particular reactants involved, the identity of the alkaline material, and the other conditions of reaction. In general, concentrations in the reaction mixture of from about 0.05 to about 5 per cent are satisfactory in the case of the relatively mildly alkaline agents. In the case of the more strongly alkaline agents, proportionally lesser amounts desirably are employed under otherwise similar conditions.

The unsaturated aldehyde and the organic nitro compound may be caused to react through carbon-to-carbon bonding, as herein described, by suitably mixing the two reactants in the presence of the alkaline condensation agent, and in the presence of a suitable inert organic solvent if desired. The organic nitro compound preferably is employed in molar excess, from about 2 to about 6 moles of organic nitro compound per mole of unsaturated aldehyde being most satisfactory. Smaller relative amounts may be used, although generally with a concomitant decrease in yield of the desired products. The reaction may be effected, for example, by gradually adding the unsaturated aldehyde to the nitro compound, with agitation and in the presence of the alkaline condensation agent, the excess of nitro compound, if liquid, serving as a solvent medium for the reaction. Additional solvents may be employed, particularly if the reactants are not normally liquid or not mutually soluble. Suitable solvents thus are, for example, ethers, hydrocarbons, chlorinated hydrocarbons, and the like. The amount of additional solvent, if one is employed, preferably is sufficient to provide a single phase reaction mixture (exclusive of any solid condensation agent if one is present), although the presence of two organic phases is not necessarily deleterious.

It has been found that the desired reaction may be effected satisfactorily at reaction temperatures of from about 0° C. to about 50° C., a preferable range of reaction temperatures being from about 20° C. to about 40° C. Reaction times of from about 2 to about 12 hours have been found to be generally effective, although either shorter or longer reaction times may be employed if desirable.

The reaction may be effected by either a batchwise process, an intermittent process, or a continuous process.

After completion of the reaction, the product of reaction may be recovered from the reaction mixture in any suitable manner. The condensation agent, if a solid present in excess, may be removed by filtration or by any other suitable means. The condensation agent, or portion thereof, dissolved in the reaction mixture may be neutralized, or precipitated as by addition of a suitable reagent reactive therewith to form insoluble products which, in turn, may be separated from the mixture as by filtration. The amount of condensation agent dissolved in the reaction mixture may at times be insufficient to be detrimental to effective recovery of the present products of reaction; in such cases its removal may be dispensed with. Excess reactants and/or the organic solvent may be removed by distillation or other suitable means. If readily crystallizable, as is generally the case, the desired reaction products then may be crystallized by allowing the remaining residue to stand at lowered temperatures, by treatment with appropriate solvents and/or non-solvents, or otherwise as will be apparent to those skilled in the art.

The condensation of alpha,beta-unsaturated aldehydes with organic nitro compounds, as herein described, provides via carbon-to-carbon bonding at both the carbonyl and the beta carbon atoms of the aldehyde, valuable and novel nitro alcohols characterized by the presence of two nitro groups attached to aliphatic carbon atoms and a hydroxyl group attached to a secondary aliphatic carbon atom. When, as in the preferred case, there are employed a secondary nitroalkane and a 2-alkenal as the reactants, there may be obtained the useful and novel dinitro secondary alkanols having structures corresponding to the structural formula

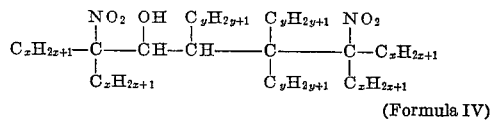

(Formula IV)

wherein each $x$ represents an integer, and each $y$ represents zero or an integer, $x$ having the same value in each $C_xH_{2x+1}$ radical and $y$ having the same value in each $C_yH_{2y+1}$ radical, but otherwise the $x$'s and the $y$'s being the same or different.

The following table presents certain specific compounds that thus may be prepared according to the present invention, and also presents by way of illustration the reactants that may be employed in each instance. The examples following the table illustrate certain specific embodiments of the process of the present invention. It will be appreciated that neither the table nor the examples are presented with the intent to limit unnecessarily the scope of the invention other than as it is defined in the appended claims.

Table I

| Reactants | | Product |
|---|---|---|
| Unsaturated Aldehyde | Nitroalkane | |
| acrolein | 2-nitrobutane | 3,7-dinitro-3,7-dimethyl-4-nonanol |
| methacrolein | 2-nitropentane | 4,8-dinitro-4,6,8-trimethyl-5-undecanol |
| crotonaldehyde | 2-nitrobutane | 3,7-dinitro-3,6,7-trimethyl-4-nonanol |
| acrolein | 3-nitropentane | 3-7-dinitro-3,7-diethyl-4-nonanol |
| methacrolein | 3-nitropentane | 3,7-dinitro-3,7-diethyl-5-methyl-4-nonanol |
| alpha-ethylacrolein | 2-nitropropane | 2,6-dinitro-2,6-dimethyl-4-ethyl-3-heptanol |
| alpha-propylacrolein | 2-nitro-3-methylbutane | 3,7-dinitro-2,3,7,8-tetra-methyl-5-propyl-4-nonanol |
| methacrolein | 3-nitropentane | 3,7-dinitro-3,7-diethyl-5-methyl-4-nonanol |
| acrolein | 3-nitrohexane | 4,8-dinitro-4,8-diethyl-5-undecanol |
| acrolein | 2-nitropropane | 2,6-dinitro-2,6-dimethyl-3-heptanol |
| methacrolein | 2-nitropropane | 2,6-dinitro-2,6-dimethyl-4-methyl-3-heptanol |
| crotonaldehyde | 2-nitropropane | 2,6-dinitro-2,6-dimethyl-5-methyl-3-heptanol |

Example I

Fifty parts of finely divided anhydrous potassium carbonate were suspended in 356 parts of 2-nitropropane, and 56 parts of acrolein were added to the mixture gradually and with agitation. After 4 hours reaction at room temperature, the potassium carbonate was removed by filtration, the excess nitropropane was evaporated under reduced pressure and the residue, which amounted to 218 parts, was cooled to 0° C. and allowed to stand at this temperature. There were recovered thereby 196 parts of crystalline 2,6-dinitro-2,6-dimethyl-3-heptanol in a conversion, based on the acrolein, of 90%.

Example II

Seventy-five parts of finely divided anhydrous potassium carbonate were dispersed in 600 parts of 2-nitropropane, and 84 parts of acrolein were added thereto. After completion of the reaction, and removal of the potassium carbonate and excess nitropropane, the residue was dissolved in benzene. The solution was decolorized by treatment with activated charcoal, isooctane was added to the decolorized solution to the point of incipient turbidity, and the resultant mixture was placed at 0° C. to crystallize the dinitroheptanol. The 2,6-dinitro-2,6-dimethyl-3-heptanol, which separated as white crystals, was found to melt at 77° C.–77.5° C.

The process of the present invention will be seen to provide a direct and simple means for utilizing the unsaturated aldehydes of the present class as raw materials for preparing organic compounds containing a group of contiguous carbon atoms larger than any group in either the unsaturated aldehyde or the second organic reactant. Other methods of increasing the length of chains of carbon atoms are known. However, such methods generally involve the use of either expensive reagents, less efficient procedures, a plurality of reactions, or similar matters which render them less attractive, particularly in applications wherein cost and efficiency are factors of consideration. Although in the present instance, dinitro alcohols are obtained as the initial products of the reaction, the method is not limited only to the preparation of such compounds as the final products. The dinitro alcohols of the present invention thus may be utilized with advantage for the preparation of a wide variety of useful organic compounds, as will be apparent to those skilled in the art, by effecting various known reactions resulting in chemical changes at either or both the hydroxyl group or the nitro groups, etc. The present invention thus provides a process of wide applicability for the preparation of organic compounds from initial reactants containing only smaller groups of carbon atoms than are present in the final products. Whereas in its preferred embodiments and as illustrated in the foregoing examples, the process of the present invention has been employed for the preparation of aliphatic dinitro alkanols of the above formula, it will be appreciated that in its broader aspects the process is applicable to the preparation of a wide variety of novel compounds, including halo-substituted dinitro secondary alkanols, aryl-substituted dinitro secondary alkanols, cycloalkyl-substituted dinitro secondary alkanols, and analogous compounds having structures represented generically by the structure Formula I given herein and having a wide field of utility in the arts.

We claim as our invention:

1. 2,6-dinitro-2,6-dimethyl-3-heptanol.
2. 2,6-dinitro-2,4,6-trimethyl-3-heptanol.
3. 2,6-dinitro-2,5,6-trimethyl-3-heptanol.
4. The aliphatic organic compounds having structures represented by the formula

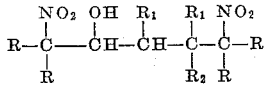

wherein R is an alkyl radical and $R_1$ is a member of the group consisting of alkyl radicals and hydrogen.

5. The process which comprises mixing one molecular equivalent of acrolein with from 2 to 6 molecular equivalents of 2-nitropropane in the presence of an alkaline condensation catalyst and in the liquid state, removing excess nitropropane, and separating 2,6-dinitro-2,6-dimethyl-3-heptanol from the residue by crystallization.

6. The process which comprises mixing one molecular equivalent of methacrolein with from 2 to 6 molecular equivalents of 2-nitropropane in the presence of an alkaline condensation catalyst and in the liquid state, removing excess nitropropane, and separating 2,6-dinitro-2,4,6-trimethyl-3-heptanol from the residue by crystallization.

7. The process which comprises mixing one molecular equivalent of crotonaldehyde with from 2 to 6 molecular equivalents of 2-nitropropane in the presence of an alkaline condensation catalyst and in the liquid state, removing excess nitropropane, and separating 2,6-dinitro-2,5,6-trimethyl-3-heptanol from the residue by crystallization.

8. The process which comprises mixing one molecular equivalent of acrolein with from 2 to 6 molecular equivalents of a secondary nitroalkane in the presence of an alkaline condensation catalyst and in the liquid state, removing excess nitroalkane, and recovering by crystallization a saturated dinitro secondary aliphatic alkanol.

9. The process which comprises mixing one molecular equivalent of an acyclic 2-alkenol containing not more than one carbon-to-carbon multiple bond with from 2 to 6 molecular equivalents of a secondary nitroalkane in the presence of an alkaline condensation catalyst and in the liquid state, and recovering an aliphatic dinitro alcohol of the general formula

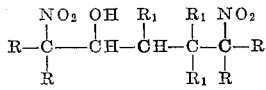

wherein R is an alkyl radical and $R_1$ is a member of the group consisting of alkyl radicals and hydrogen.

10. The process which comprises mixing one molecular equivalent of acrolein with from 2 to 6 molecular equivalents of 2-nitropropane in the presence of an alkaline condensation catalyst at room temperature, after the reaction removing excess nitropropane, and cooling the residue to 0° C. to separate therefrom by crystallization 2,6-dinitro-2,6-dimethyl-3-heptanol.

CURTIS W. SMITH.

REFERENCES CITED

The following references are of record in the file of this patent:

UNITED STATES PATENTS

| Number | Name | Date |
|---|---|---|
| 2,332,482 | Degering | Oct. 19, 1943 |

Certificate of Correction

Patent No. 2,475,996                      July 12, 1949

CURTIS W. SMITH

It is hereby certified that errors appear in the printed specification of the above numbered patent requiring correction as follows:

Column 2, lines 30 to 33 inclusive, Formula II, for

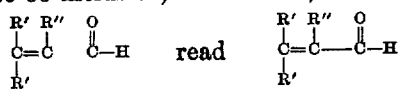

column 7, lines 27 to 30 inclusive, for that portion of the formula reading

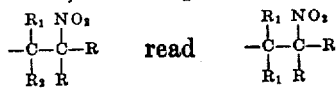

column 8, line 17, for "2-alkenol" read *2-alkenal*;

and that the said Letters Patent should be read with these corrections therein that the same may conform to the record of the case in the Patent Office.

Signed and sealed this 10th day of January, A. D. 1950.

[SEAL]

THOMAS F. MURPHY,
*Assistant Commissioner of Patents.*